(12) United States Patent
Wobben

(10) Patent No.: US 7,033,139 B2
(45) Date of Patent: Apr. 25, 2006

(54) COOLING DEVICE FOR A WIND TURBINE GENERATOR

(76) Inventor: Aloys Wobben, Argestrasse 19, Aurich (DE) 26607

( * ) Notice: Subject to any disclaimer, the term of this patent is extended or adjusted under 35 U.S.C. 154(b) by 123 days.

(21) Appl. No.: 10/478,067

(22) PCT Filed: Apr. 18, 2002

(86) PCT No.: PCT/EP02/04273

§ 371 (c)(1),
(2), (4) Date: Apr. 19, 2004

(87) PCT Pub. No.: WO02/095222

PCT Pub. Date: Nov. 28, 2002

(65) Prior Publication Data

US 2004/0179934 A1    Sep. 16, 2004

(30) Foreign Application Priority Data

May 18, 2001 (DE) ................................ 101 24 268

(51) Int. Cl.
*F03D 11/00* (2006.01)
(52) U.S. Cl. .................. 415/178; 415/200; 415/220
(58) Field of Classification Search ............... 415/177, 415/178, 200, 220
See application file for complete search history.

(56) References Cited

U.S. PATENT DOCUMENTS 3,508,092 A * 4/1970 Hallidy ................. 310/64
4,840,222 A    6/1989 Lakin et al. ............ 165/47
6,774,504 B1 * 8/2004 Lagerwey ............... 290/44

FOREIGN PATENT DOCUMENTS

| DE | 677 398 | 6/1939 |
| DE | 33 47 555 A1 | 7/1985 |
| DE | 256 169 A1 | 6/1986 |
| DE | 196 36 591 A1 | 3/1998 |
| DE | 199 32 394 A1 | 1/2001 |
| DE | 100 00 370 A1 | 7/2001 |
| EP | 0 611 922 B1 | 8/1994 |
| EP | 1 081 376 A1 | 3/2001 |
| FR | 2 756 676 | 6/1998 |

* cited by examiner

*Primary Examiner*—Ninh H. Nguyen
(74) *Attorney, Agent, or Firm*—Seed IP Law Group PLLC

(57) ABSTRACT

The present invention concerns a wind power installation comprising a ring generator and a housing having a heat-conducting housing portion in the region of the ring generator. Previously known structures suffer from the disadvantage that mechanical vibrations and oscillations of the generator can be perceived as acoustic disturbance and interference. The object of the present invention is very substantially to eliminate that disadvantage. A wind power installation comprising a ring generator and a pod housing, which surrounds the ring generator, of the wind power installation, wherein the pod housing has a heat-conducting housing portion in the region of the ring generator and a predetermined spacing is provided between the outside periphery of the ring generator and the heat-dissipating housing portion.

12 Claims, 2 Drawing Sheets

COOLING DEVICE FOR A WIND TURBINE GENERATOR

BACKGROUND OF THE INVENTION

1. Field of the Invention

Figure 1:
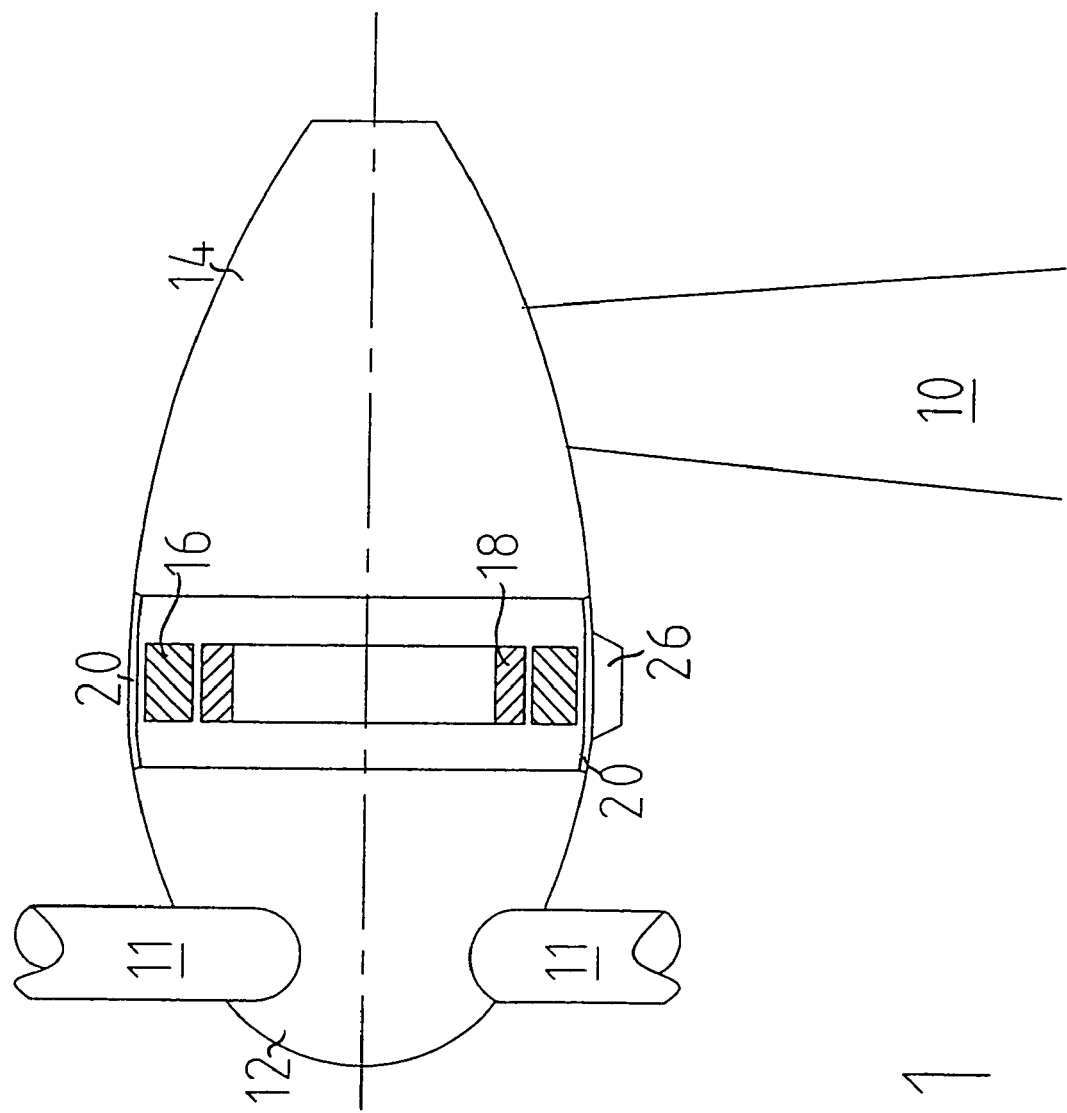

The present invention concerns a wind power installation comprising a ring generator and a housing having a heat-conducting housing portion in the region of the ring generator.

2. Description of the Related Art

The conversion of energy regularly involves losses in the form of heat. That naturally also applies in regard to the conversion of the kinetic energy of the wind into electrical energy in the generator of a wind power installation, those losses also regularly occurring in the main drive train of the wind power installation. In the main drive train which is disposed in the pod of the wind power installation, the losses occur for the major part in the generator.

Hitherto that heat due to energy losses has been discharged to the ambient atmosphere by using fans, either by cold air being sucked in from the exterior or by the heated air being circulated within the pylon and the heat being discharged to the exterior by way of the wall of the pylon.

DD 256 169 which is considered to be the most relevant state of the art discloses a wind power installation having a ring generator whose stator is accommodated in positively locking relationship by a so-called converter housing (pod) which in turn is provided with cooling plates.

That known structure however suffers from the disadvantage that mechanical vibrations and oscillations of the generator can be perceived as acoustic disturbance and interference.

BRIEF SUMMARY OF THE INVENTION

In accordance with the invention, in a wind power installation of the kind set forth in the opening part of this specification, that object is attained by a predetermined spacing between the outside periphery of the ring generator and the heat-conducting housing portion.

That predetermined spacing between the outside periphery of the ring generator and the heat-conducting housing portion affords mechanical decoupling of the generator and the pod housing so that mechanical vibration cannot be transmitted from the generator around the housing and thus perceived in the surroundings. In that respect, the heat energy admittedly has to be transmitted through air, but it is also possible for that purpose for energy which initially is emitted laterally by the generator to be taken up and discharged outwardly.

A particularly simple mounting option is afforded if the heat-conducting housing portion is fixed to a stationary part of the pod housing.

In order to increase the surface area which is operative in the discharge of heat, cooling ribs can be provided distributed over the outside periphery in an axial orientation.

In a particularly preferred feature the heat-conducting portion is made from aluminum as aluminum is advantageously low in weight and enjoys good thermal conductivity. In that respect, in a further preferred embodiment the shape of the heat-conducting housing portion is matched to the shape of the pod housing.

In a preferred development of the present invention the heat-conducting housing portion projects beyond the generator at at least one side by a predetermined amount so that amounts of heat which are initially emitted to the side from the generator can also still be discharged to the ambient atmosphere.

Advantageous embodiments are recited in the appendant claims.

BRIEF DESCRIPTION OF THE SEVERAL VIEWS OF THE DRAWING(S)

Figure 2:
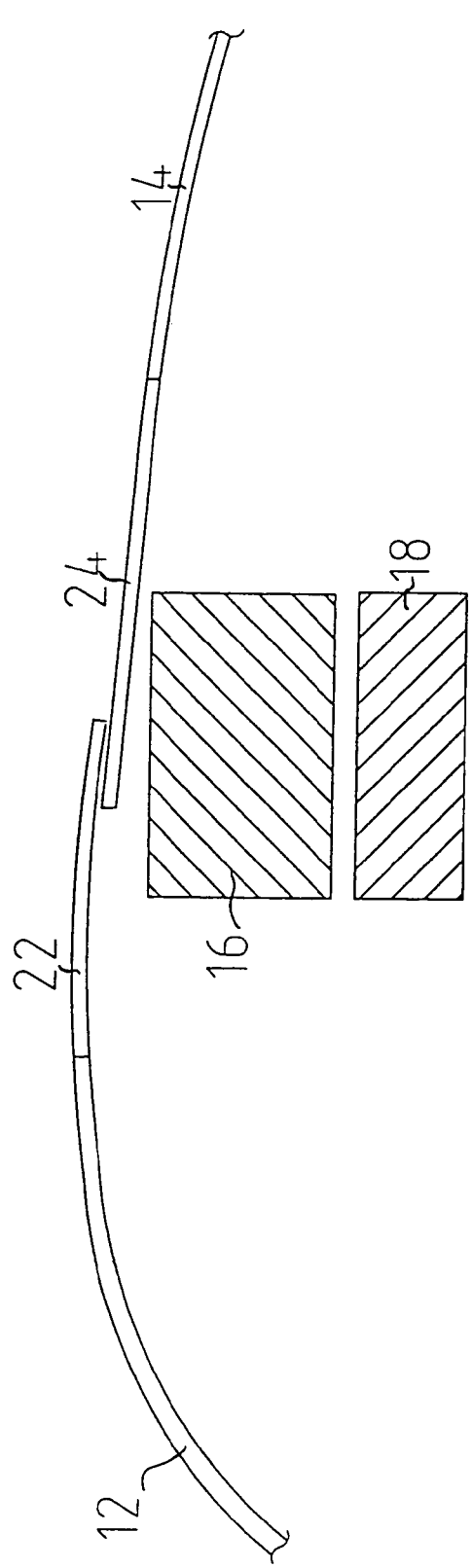

The invention is described in greater detail hereinafter with reference to the drawings in which:

FIG. 1 shows a simplified side view of a wind power installation according to the invention, and FIG. 2 shows a simplified detail view of an alternative embodiment of the present invention.

DETAILED DESCRIPTION OF THE INVENTION

In FIG. 1 reference 10 denotes the upper portion of a pylon which carries the pod of the wind power installation according to the invention. That pod has a front portion 12 and a rear portion 14.

The front portion 12 includes the roots of the rotor blades 11 of which portions are shown, and it rotates with the rotor.

The rear portion 14 encloses the ring generator with its stator 16 and its rotor 18. Accordingly, the stator 16, like the rear region of the pod 14, is stationary while the rotor 18 co-operates by means of the wind power installation rotor hub (not shown) with the rotor blades 11.

In the region of the generator 16, 18 at a predetermined spacing relative thereto a portion 20 of the rear part of the pod housing 14 is formed from a heat-conducting material, preferably aluminum. That heat-conducting housing portion 20 receives the heat emitted by the generator 16, 18 and discharges it to the ambient air flowing therepast. By virtue of the predetermined air gap between the stator 16 of the generator and the heat-conducting housing portion 20, there is no direct mechanical connection between those two components so that vibration is not transmitted from the generator to that heat-conducting housing portion 20 and thus does not become audible at the exterior.

As the heat-conducting housing portion 20 is wider in the axial direction than the generator it can also pick up amounts of heat which are initially emitted laterally by the generator 16, 18 and discharge them to the ambient atmosphere.

In the region between the head of the pylon 10 and the downwardly facing rotor blade attachment 11 a cooling rib 26 is illustrated on a heat-dissipating housing portion 20 of the pod housing 14 on the outside thereof. That cooling rib increases the surface area of the heat-dissipating housing portion 20 so that the heat can be better discharged to the external environment. Such cooling ribs 26 can be arranged—on the inside and/or the outside—on the entire outside periphery (or parts thereof) (or on the inside periphery) of the pod housing. If such cooling ribs are arranged on the inside then the cooling ribs are provided in particular in the side region of the heat-conducting housing portion 20 which is not provided directly above the stator 16 of the generator.

FIG. 2 shows an alternative embodiment in which the heat-conducting housing portion 20 is divided into two portions 22 and 24 which overlap each other. In this case a housing portion 12 is connected to a part of the heat-conducting housing portion 22 while the second part of the pod 14 is connected to a second part of the heat-conducting housing portion 24. In this case, both the housing portion 12 and also the pod housing 14 are preferably made from a non-metallic material and thus not ideally heat-conducting substance, for example GRP.

As the wind power installation illustrated in this embodiment is a so-called windward rotor type, the wind will always firstly flow over the first housing portion 12 with the heat-conducting housing portion 22 adjoining same, before the wind reaches the second heat-conducting housing portion 24 which then goes into the second pod portion 14. Therefore, moisture is always transported by the wind from the portion 22 and then by way of the portion 24 to the rear side (lee side) of the wind power installation and cannot penetrate through a gap between the portions 22 and 24 into the pod to any extent worth mentioning.

It will be appreciated that it is possible to provide, between the two heat-conducting housing portions 22, 24, sealing means which make the ingress of moisture still more difficult.

If the interior of the housing of the pod is under a certain increased pressure the air can escape by way of the gap between the two housing portions 22, 24 so that any entry of moisture into the interior of the pod can be prevented.

In this embodiment of the present invention also the extent of the heat-conducting housing portions 22, 24 in the axial direction is markedly greater than the extent of the generator 16, 18 in order again to be able to dissipate laterally emitted heat.

What is claimed is:

1. A wind power installation comprising:
   a ring generator; and
   a pod housing, which surrounds the ring generator, of the wind power installation, wherein the pod housing has a heat-dissipating housing portion in the region of the ring generator and a predetermined spacing is provided between the outside periphery of the ring generator and the heat-dissipating housing portion, wherein the heat-dissipating housing portion comprises a different material from the pod housing.

2. A wind power installation according to claim 1 characterized by a fixing of the heat-conducting housing portion to a stationary part of the housing.

3. A wind power installation according to claim 1 characterized by cooling ribs arranged in spaced relationship on the outside periphery, in an axial orientation.

4. A wind power installation according to claim 1 characterized by a fixing of the heat-dissipating housing portion to a rotating part of the housing.

5. A wind power installation according to claim 1 characterized by division of the heat-dissipating housing portion along the periphery into two mutually separate portions, wherein the first portion is mounted to the rotating part of the housing and the second portion is mounted to the stationary part of the housing.

6. A wind power installation according to claim 5 characterized by cooling ribs on the second part of the heat-dissipating housing portion.

7. A wind power installation according to claim 6 characterized in that the cooling ribs are provided on the heat-dissipating housing portion on the outside and/or the inside.

8. A wind power installation according to claim 5 characterized in that the first part of the heat-dissipating housing portion overlaps the second part of the heat-conducting housing portion.

9. A wind power installation according to claim 5 characterized by sealing means between the first and second heat-conducting housing portions.

10. A wind power installation according to claim 1 characterized in that the heat-dissipating housing portion is substantially made from aluminum.

11. A wind power installation according to claim 1 characterized in that the shape of the heat-dissipating housing portion is matched to the shape of the pod housing.

12. A wind power installation according to claim 1 characterized in that the heat-dissipating housing portion projects beyond the generator at at least one side in the axial direction by a predetermined amount.

\* \* \* \* \*